Oct. 15, 1935.    A. D. WHAMOND    2,017,424
APPARATUS FOR TESTING RAILROAD SIGNAL SYSTEMS
Filed June 27, 1934    4 Sheets-Sheet 3
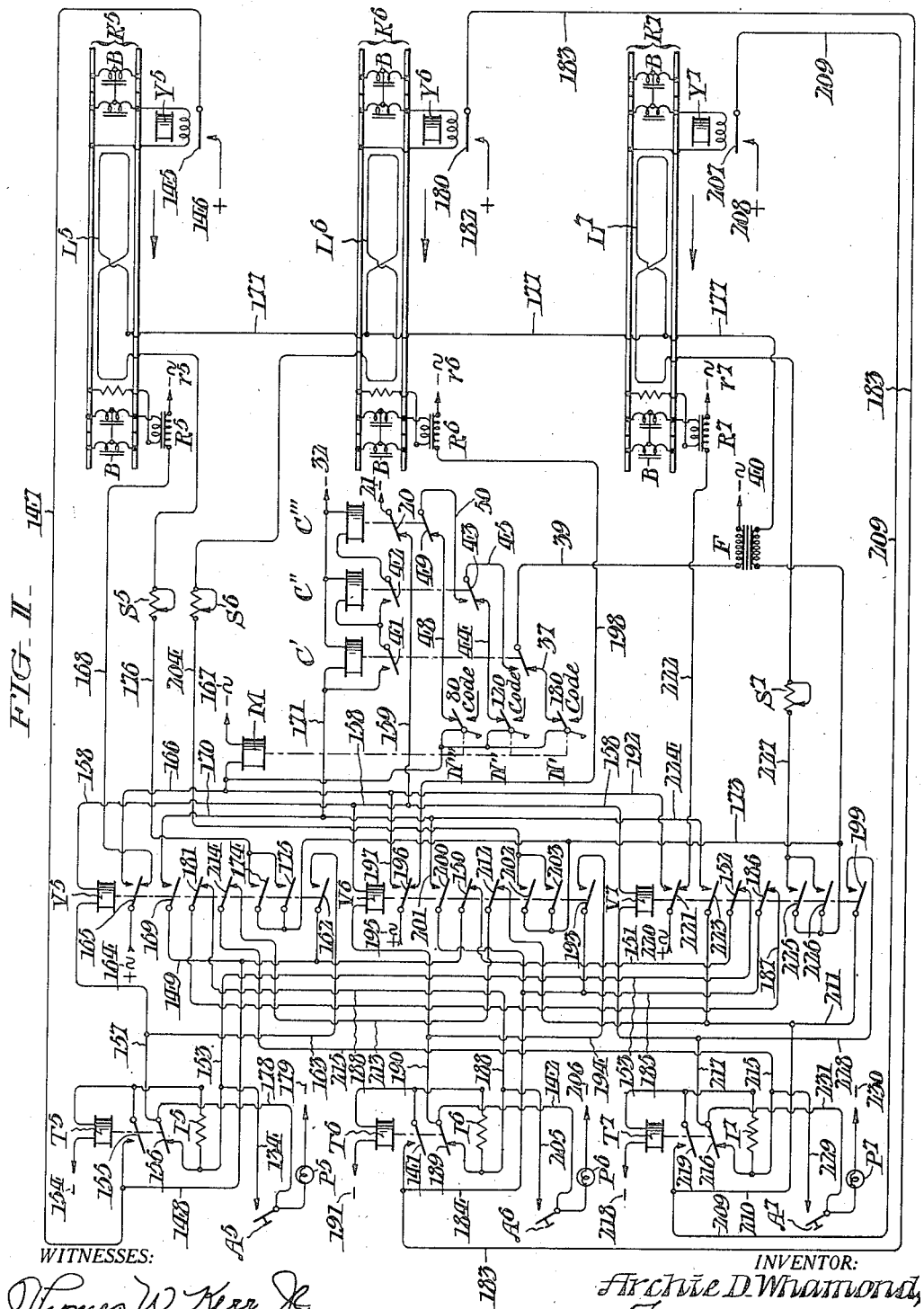

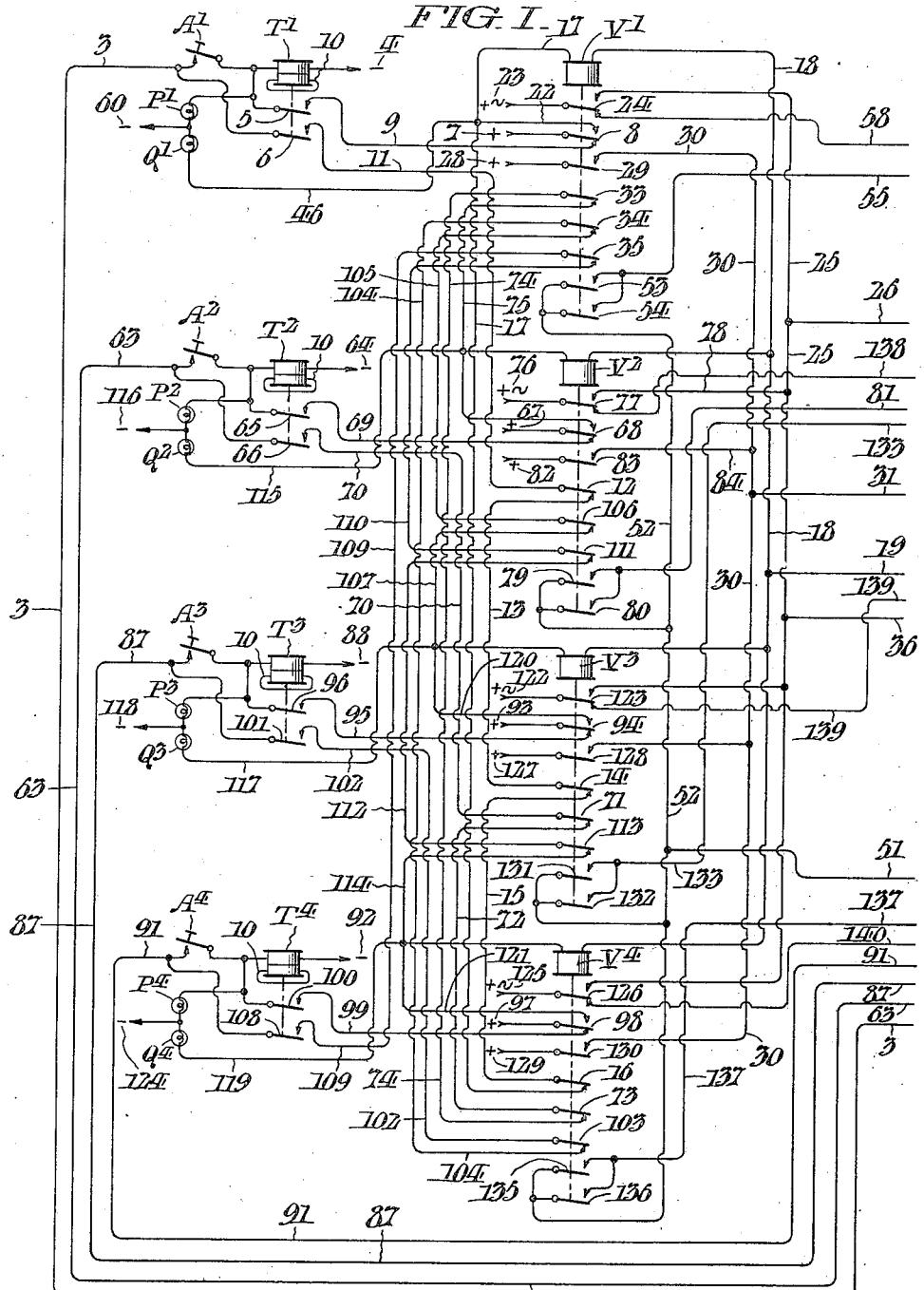

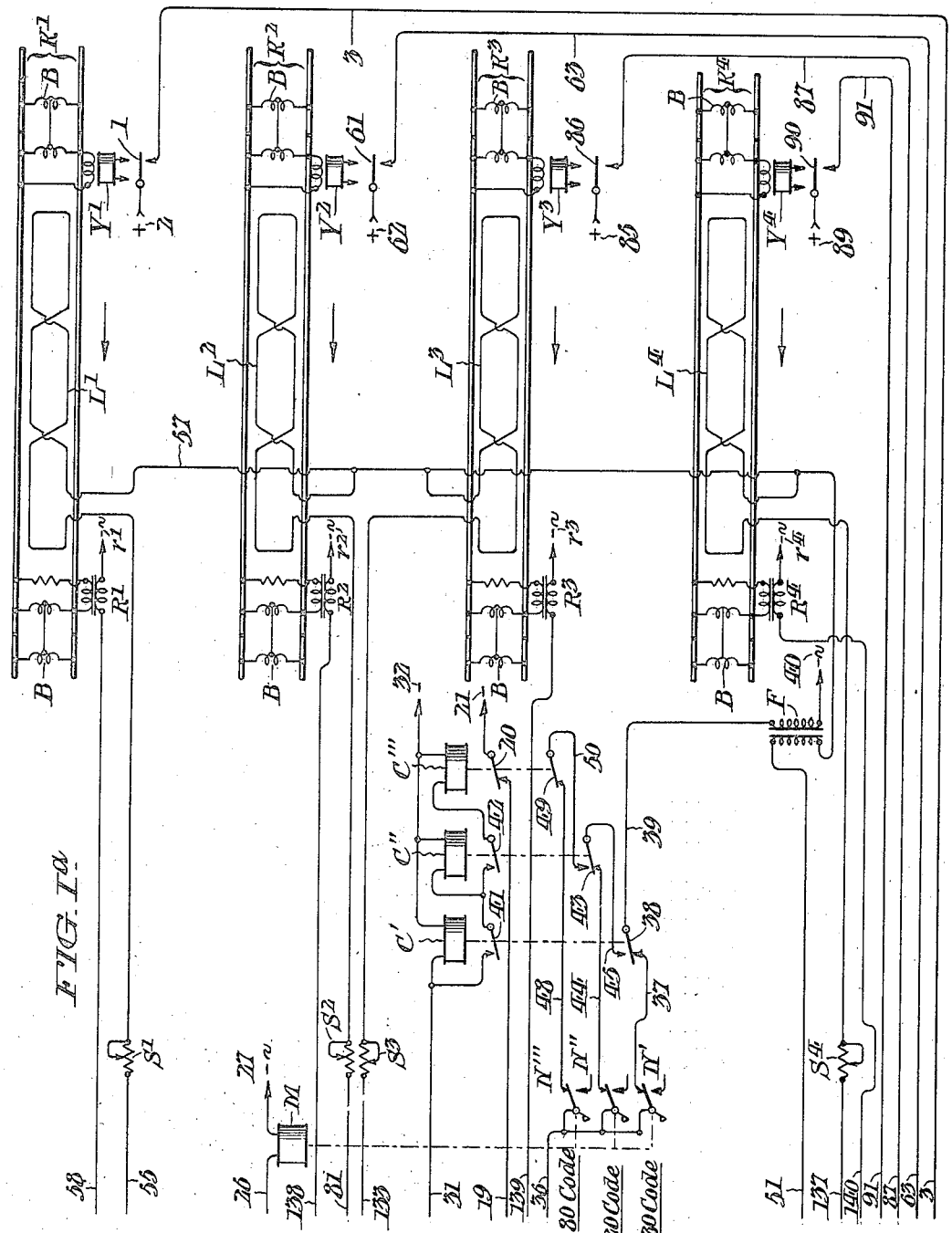

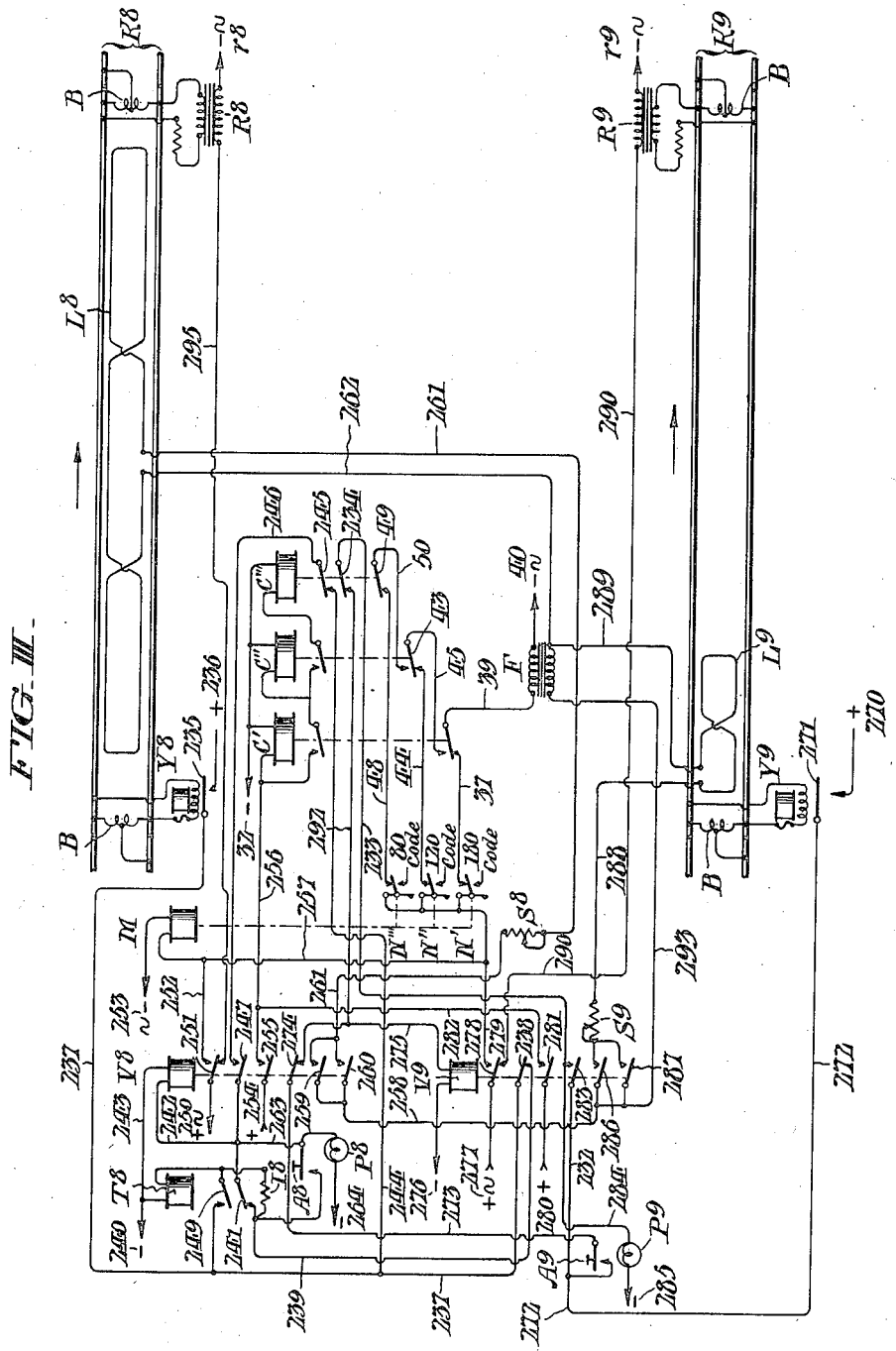

Patented Oct. 15, 1935

2,017,424

UNITED STATES PATENT OFFICE 2,017,424

APPARATUS FOR TESTING RAILROAD SIGNAL SYSTEMS

Archie D. Whamond, Philadelphia, Pa.

Application June 27, 1934, Serial No. 732,573

9 Claims. (Cl. 246—63)

This invention relates to apparatus for testing railroad signal systems, and while applicable to many types of systems, is particularly adapted for use with continuous inductive cab signal systems in which instrumentalities on a locomotive or a car respond to currents in a wayside circuit to provide at the engineman's station visible indications representing the condition of the trackway in advance.

One of the requirements in the operation of cab signal equipment is a periodic operating test by the engineman, conducted either preparatory to the departure of the vehicle from a terminal, or while the vehicle is passing into cab signal territory. It has heretofore been proposed to conduct such a test by means of a test circuit for transmitting to the vehicle to be tested the various code signals in a prescribed succession with each separate code signal continued for a predetermined interval of time. The test when successfully concluded demonstrates to the satisfaction of the engineman that the vehicle equipment is operating properly.

The principal object of the present invention is to reduce the time required for testing cab signal equipment, which is particularly important in those regions where there is a large volume of traffic, without unduly increasing the amount of equipment needed for conducting the test.

A more particular object of the invention is to provide testing equipment selectively controlling a number of test track circuits in such manner that a series of tests may be performed with a minimum of delay in the event that the tracks of the test section become occupied simultaneously, the equipment being so designed as to prevent the possibility of partial tests on any of the associated track circuits.

Another specific object of the invention is to provide for the automatic initiation of a test when a vehicle enters upon the territory of the test track circuit, as well as the automatic disconnection of the testing apparatus from that circuit upon the conclusion of the test.

Still another object of the invention is to prevent interference between the track current of the regular signal system and the current induced in the track circuit for the purpose of performing a test.

Other objects and advantages characterizing my present invention will become more apparent from the detailed description hereinafter set forth of several examples of apparatus embodying the invention, having reference to the accompanying drawings. Of the drawings:

Fig. I represents a diagrammatic illustration of a group of relays forming part of a complete testing circuit embodying my invention.

Fig. I—A represents a code transmitting device, code timing relays, and track circuits and other instrumentalities forming with Fig. I a complete testing circuit, the wires shown at the right hand margin of Fig. I connecting with the wires shown at the left hand margin of Fig. I—A.

Fig. II represents a modified form of testing apparatus of my invention providing for automatic initiation of a test upon the entrance of a train into cab signal territory; and, Fig. III represents still another modification of my invention in which the testing of one track circuit is automatically controlled and the testing of another track circuit is manually controlled.

In Figs. I and I—A, which together show the complete testing apparatus of the first example of my invention, four tracks are represented at $K^1$, $K^2$, $K^3$, $K^4$. Each track has associated therewith a test track circuit in the form of a loop, such test track circuits being designated by the letter L with an exponent corresponding to the number of the track. Bridging the insulated joint at the entrance end of the track $K^1$ there is an impedance bond B, and connected across the rails there is a track relay $Y^1$ normally energized by current flowing in the rails. At the exit end of the track section $K^1$ there is shown an additional impedance bond B bridging the insulated joint, and a track transformer $R^1$ which is connected across the rails. Associated with the tracks $K^2$, $K^3$, $K^4$, there are similar track relays and track transformers designated by the letters Y and R, respectively, with exponents corresponding to the number of the track.

At the left hand of Fig. I—A there is shown a test circuit which is adapted for connection with any one of the track circuits $L^1$, $L^2$, $L^3$, $L^4$, for the purpose of inducing therein code signals in a prescribed order and with a prescribed time interval between each signal. The test circuit includes a code transmitter M which operates coding units designated at N', N", N''', and code timing relays designated at C', C", C'''. It will will be observed that the test circuit employed is substantially the same as that shown in U. S. Letters Patent to King No. 1,796,376, granted March 17, 1931. In this apparatus the coding units N', N", N''', are adapted to be rendered effective in alternate succession to transmit current at, say, 180 interruptions per minute, 120 interruptions per minute, and 80 interruptions per minute, respectively, to the loop transformer F. The code signals thus produced by the coding units N', N'', N''', correspond with the signals generally used in the regular operation of the signal system for producing cab signal indications, such as "clear", "approach restricting" and "approach". It will be understood that this invention contemplates adaptation of the testing equipment to various signal systems, and that the particular interrupted coded current supplied by the test circuit represents only one example of a manner of producing code signals. Associated with the code transmitter M there are provided three code timing relays C', C'', C''', these relays being designed to have a pick up time delay of eight to ten seconds, and a quick release. The code timing relays C', C'', C''', operate in alternate succession and in conjunction with the coding units N', N'', N''', to transmit interrupted current to the loop transformer F, with the various codes generated in sequence with a definite time interval between each code as will be more fully explained. All of the parts are shown in the drawings in the positions assumed by them when the test tracks are unoccupied and the testing apparatus is not in use.

As shown in Fig. I there is associated with each track circuit a quick release relay designated by the letter V with an exponent corresponding to the number of the track. For the purpose of controlling the operation of the relays $V^1$, $V^2$, $V^3$, $V^4$, there are provided additional retarded pick up relays $T^1$, $T^2$, $T^3$, $T^4$. Current for energizing the retarded pick up relays $T^1$, $T^2$, $T^3$, $T^4$, is supplied through push button switches $A^1$, $A^2$, $A^3$, $A^4$, the latter switches being open at all times except while pressed down by hand. For the convenience of the operator, I preferably provide pilot lights $P^1$, $P^2$, $P^3$, $P^4$, and $Q^1$, $Q^2$, $Q^3$, $Q^4$, to indicate the condition of the relays $T^1$, $T^2$, $T^3$, $T^4$.

In the illustrated example of the invention, direct current is utilized for energizing all of the above mentioned relays, and the positive and negative battery connections are indicated by plus and minus signs. Alternating current is used for the operation of the code transmitter M and the connections to the main supply lines are designated by plus or minus signs together with the alternating current symbol.

The operation of the testing apparatus illustrated in Figs. I and I—A is as follows: Let it be assumed that the tracks $K^1$, $K^2$, $K^3$, $K^4$, are unoccupied and that a train enters the test territory on track $K^1$. Before the train reaches the track circuit $L^1$, the car axles of the leading vehicle will shunt the track relay $Y^1$, causing its normally lifted contact 1 to drop. If the push button $A^1$ is closed while the track relay $Y^1$ is released, current will flow from positive battery 2 through contact 1 (dropped) of relay $Y^1$, conductor 3, push button $A^1$, relay $T^1$ to negative battery 4. Relay $T^1$ will then be energized and its contacts 5 and 6 lifted. Moreover, with automatic release of the push button $A^1$ the relay $T^1$ will remain energized over a stick circuit with current flowing from positive battery as indicated at 7, contact 8 (dropped) of relay $V^1$, conductor 9, contact 5 (lifted) of relay $T^1$, the armature of relay $T^1$, to negative battery 4. Thus the attendant after he has pressed the push button $A^1$ need not remain at that station, but may proceed with other duties.

The relay $T^1$, as well as the relays $T^2$, $T^3$, and $T^4$, may have one of its operating coils short circuited as indicated at 10 in order to slightly retard its pick up. After the relay $T^1$ has operated, current flows through its contact 6 (lifted) to conductor 11, and from thence through contact 12 (dropped) of relay $V^2$, conductor 13, contact 14 (dropped) of relay $V^3$, conductor 15, contact 16 (dropped) of relay $V^4$ to conductor 17, through the armature of relay $V^1$ to conductor 18, and through branch conductor 19 and contact 20 (dropped) of the code timing relay C''' to negative battery 21. It will be observed at this point that in the event that any one of the other test track sections is occupied by a vehicle, the relay $V^1$ will not pick up because this relay is initially energized over a circuit which includes the back contacts of the similar relays associated with the other track circuits. Hence if a test is in progress on any one of the other track circuits of the group, the relay $V^1$ will not pick up until the test in progress is completed. However, as soon as the test in progress is completed, the relay $V^1$ will automatically be energized without further manual attention.

As soon as the relay $V^1$ picks up, the previously described stick circuit over its contact 8 is transferred to the relay $V^1$ itself. In this situation current flows from positive battery as indicated at 7, through contact 8 (lifted), to conductor 22, and thence through conductor 17, and through the armature of relay $V^1$ over the circuit previously mentioned, to negative battery at 21. When the stick circuit has thus been transferred to the relay $V^1$ itself, the relay $T^1$ releases, its release being delayed, however, by reason of the fact that one of its coils is short circuited as indicated at 10, and the period of the delay being sufficient to bridge the time required for the transfer of the stick circuit.

With the relay $V^1$ thus energized, alternating current of, say, 100 cycle frequency is supplied from one side of the line as indicated at 23, over contact 24 (lifted) of relay $V^1$, to conductor 25, and thence through branch conductor 26, and through the code transmitter M to the other side of the line as indicated at 27. Battery energy is also supplied to the code timing relay C', with current flowing from positive battery 28, over contact 29 (lifted) of relay $V^1$, to conductor 30, and thence through branch conductor 31, and through the code timing relay C', to negative battery at 32. At the same time the lifting of contacts 33, 34 and 35 of relay $V^1$ makes it impossible for the relays $V^2$, $V^3$, $V^4$, to be operated, for their pickup circuits are broken, thus preventing tests on other tracks being initiated and eliminating the possibility of a partial test.

With the code transmitter M in operation, coded current interrupted 180 times per minute is supplied to the loop transformer F over the following circuit: Current flows from the positive side of the line as indicated at 23, over contact 24 (lifted) of relay $V^1$, to conductor 25, and thence through branch conductor 36 to the coding unit N' and through this unit to conductor 37, thence over contact 38 (dropped) of the code timing relay C' to conductor 39, and through the primary winding of loop transformer F to the negative side of the line as indicated at 40. The code timing relay C' is so designed that its operation is delayed for a period of about eight to ten seconds. After the expiration of this period, its contacts 38 and 41 are lifted and held lifted. Lifting of contact 41, of code timing relay C', causes current to flow through the armature of the code timing relay C'' to negative battery at 32, thus, after a period of delay, energizing the latter relay and causing its contacts 42 and 43 to be raised. During the period of delay current interrupted 120 times per minute flows from coding unit N'' through conductor 44, contact 43 (dropped) of code timing relay C'', conductor 45, contact 38 (raised) of code timing relay C', conductor 39, and through the primary winding of transformer F to the negative side of the line as indicated at 40. After the expiration of this period the contacts 42 and 43 of code timing relay C'' are raised causing current to flow through the armature of C''' to negative battery at 32. Before the code timing relay C''' operates, current interrupted 80 times per minute flows from the coding unit N''', through conductor 48, contact 49 (dropped) of code timing relay C''', conductor 50, contact 43 (lifted) of code timing relay C'', conductor 45, contact 38 (lifted) of code timing relay C', conductor 39, thence through the primary winding of loop transformer F to the negative side of the line as indicated at 40.

After an additional period of delay of about eight to ten seconds, the code timing relay C''' picks up, breaking the negative return circuit over which the relay V¹ is energized, which in turn opens the circuit to the code timing relays C', C'', C''', causing their release. Moreover, the code transmitter M stops and the pick up circuits for the relays V², V³, V⁴ are restored.

From the above description it will be noted that code signals are simulated by the coding units N', N'', N''', associated with the code transmitter M, with each variety of signal supplied in a predetermined order and for a predetermined interval. The signals thus generated are induced into the secondary winding of the loop transformer F, and carried to the test track circuit L¹, current flowing from the secondary winding of the loop transformer F, over branch conductor 51, to main conductor 52, and thence through contacts 53 and 54 of the relay V¹ to conductor 55, and thence through an adjustable resistor S¹ to the test track circuit L¹. From the test track circuit L¹, current flows through conductor 57 to the other side of the secondary winding of the loop transformer F. Accordingly, the vehicle passing over the test track circuit L¹ receives the simulated signals in the proper order, and is thus supplied with a comprehensive test for determining the proper functioning of its cab signal equipment. It will be noted that the test when completed is immediately shut-off through the previously described action of the code timing relay C''' so that there is no repetition thereof while the vehicle remains over the track circuit L¹.

It has been found that if the direction of traffic, or the design of the track circuit, is such that the normal current feed is from the exit end of the block toward the car or locomotive to be tested, and if the track current is of the same frequency as the test current, there will result a steady output of the amplifier of the track circuit of such magnitude that the coded current cannot vary it sufficiently to operate the master relay. Accordingly, it is desirable in such a situation to remove the normal track current feed of the regular signal system while the test is being performed and to restore such current immediately upon the conclusion of the test. This function is accomplished by contact 24 of the relay V¹. Current to the regular track signal system is supplied from the positive side of the line as indicated at 23, over contact 24 (dropped) of relay V¹, through conductor 58, and through the track transformer R¹ to the negative side of the line as indicated at r¹. Whenever relay V¹ is energized, the lifting of its contact 24 breaks the aforementioned circuit and removes the regular track signal circuit from the track transformer R¹. When the relay V¹ releases, the dropping of contact 24 restores this circuit.

For the convenience of the operator, the pilot lights designated by the letters P and Q, with exponents corresponding to the number of the track with which they are associated, are desirably of different colors. For example, the pilot light P¹ may be of a white color and the pilot light Q¹ of an amber color. The pilot light P¹ is illuminated when the stick circuit is established for relay T¹ by the closing of contact 5, with current flowing from positive battery as indicated at 7, through contact 8 (dropped) of relay V¹, conductor 9, contact 5 (lifted), and through the pilot light P¹ to negative battery at 60. When the actual test starts, and the relay V¹ picks up, the amber light Q¹ will be illuminated with current flowing from positive battery at 7 through contact 8 (lifted), over conductors 22 and 46, and through the light Q¹ to negative battery at 60. Thus the operator, after he has pressed the push button A¹, can determine immediately whether the relays T¹ and V¹ have operated in the proper manner to initiate the test. If the amber light does not show, he will know that it is because a test is in progress on one of the track circuits L², L³, L⁴.

In the event that while a test is being performed on track circuit L¹ a train enters track K² and the operator attempts to initiate a test on that track, by pressing the push button A², the following operation takes place. The entrance of the train into the test territory on track K² shunts the track relay Y² and causes its contact 61 to drop. Closing of the push button A² permits current to flow from positive battery at 62, through contact 61 (dropped), conductor 63, push button A², and through the armature of relay T², to negative battery at 64. Contacts 65 and 66 of relay T² are then lifted, and a stick circuit is immediately established for relay T², with current flowing from positive battery as indicated at 67, through contact 68 (dropped) of relay V², conductor 69, contact 65 (lifted) of relay T², and the armature of relay T² to negative battery at 64. However, the operation of relay T² is in this case not followed immediately by the operation of relay V², for the energizing circuit of relay V² is broken at contact 35 of the relay V¹. Accordingly, under these conditions the white light P² will be illuminated, indicating the pick up of relay T², but the amber light Q² will not be illuminated. As soon, however, as the test on track K¹ has been completed, and the relay V¹ has been restored to its normal condition, the test on track K² will automatically proceed without further attention on the part of the operator. Thus after the relay V¹ has released, current will flow from conductor 63, through contact 66 (lifted) of relay T², and thence through conductor 70, contact 71 (dropped) of relay V³, conductor 72, contact 73 (dropped) of relay V⁴, conductor 74, contact 33 (dropped) of relay V¹, to conductor 75, and thence through relay V², conductor 18, branch conductor 19, contact 20 (dropped) of code timing relay C''' to negative battery at 21.

With the relay V² in operation, the testing circuit will apply the various code signals to track circuit L² in the manner previously described, except that the source of energy is from the positive side of the line as indicated at 76, through contact 77 (lifted) of relay V², and thence through conductor 78, conductor 25, branch conductor 26, the code transmitter M to the negative side of the line as indicated at 27. In this situation, the secondary circuit into which the code signals are induced involves the secondary winding of loop transformer F, conductor 51, conductor 52, contacts 79 and 80 of relay V², conductor 81, resistor S² test track circuit L², and conductor 57. Moreover, it will be observed that when the test is carried out on track K², the code timing relays C', C'', C''', are energized with current flowing from positive battery at 82, over contact 83 (lifted), conductor 84, branch conductor 31 to negative battery at 32.

For the purpose of illustrating how tests may be simultaneously performed on two tracks, as well as incidentally describing the circuits associated with tracks K³ and K⁴, let it be assumed that the track circuits L³ and L⁴ are both occupied by vehicles and that the track relays Y³ and Y⁴ are therefore released. The operator desiring to perform simultaneous tests on tracks K³ and K⁴ performs the following operations. Push buttons A³ and A⁴ are simultaneously pressed down. Relay T³ is then energized with current flowing from positive battery at 85, through contacts 86 (dropped) of track relay Y³, conductor 87, push button A³, the armature of relay T³, to negative battery 88. Likewise relay T⁴ is energized with current flowing from positive battery 89, through contact 90 (dropped) of relay Y⁴, conductor 91, push button A⁴, the armature of relay T⁴ to negative battery 92. A temporary stick circuit is established for relay T³ with current flowing from positive battery at 93, through contact 94 (dropped) of relay V³, conductor 95, contact 96 (lifted), and through relay T³ to negative battery at 88. Likewise a temporary stick circuit is established for relay T⁴ with current flowing from positive battery at 97 through contact 98 (dropped) of relay V⁴, conductor 99, contact 100 (lifted), and through relay T⁴ to negative battery at 92.

With the relay T³ energized, current from conductor 87 is free to pass through contact 101 (lifted) of relay T³ to conductor 102, and thence through contact 103 (dropped) of relay V⁴, conductor 104, contact 34 (dropped) of relay V¹, conductor 105, contact 106 (dropped) of relay V², conductor 107, through the armature of relay V³, conductor 18, conductor 19, and contact 20 (dropped) of code timing relay C''', to negative battery at 21. Thus relay V³ will be energized. At the same moment relay V⁴ will become energized over a similar circuit with current flowing from conductor 91, through contact 108 (lifted) of relay T⁴, conductor 109, contact 35 (dropped) of relay V¹, conductor 110, contact 111 (dropped) of relay V², conductor 112, contact 113 (dropped) of relay V³, conductor 114, through the armature of relay V⁴, to conductor 18, and thence through branch conductor 19 and contact 20 (dropped) of relay C''' to negative battery 21.

When the relays V³ and V⁴ are thus simultaneously energized, the stick circuits are transferred from the relays T³ and T⁴ as follows. As to relay V³, current flows from positive battery 93 over contact 94 (lifted) of relay V³, conductor 120, to relay V³, thence over conductors 18 and 19 to negative battery at 21. As to relay V⁴, current flows from positive battery 97, over contact 98 (lifted) of relay V⁴, conductor 121, to relay V⁴, and thence over conductors 18 and 19 to negative battery at 21.

With the relays V³ and V⁴ energized, the code transmitter M is operated with current supplied from two sources. Current flows from the positive side of the line as indicated at 122, through contact 123 (lifted) of relay V³, to conductor 25, and thence over branch conductor 26, through the code transmitter M to the negative side of the line as indicated at 27. Current also flows from the positive side of the line as indicated at 125, through contact 126 (lifted) of relay V⁴ to conductors 25 and 26, and thence to the code transmitter M. Likewise the code timing relays C', C'', C''', are energized from two sources. In the case of relay V³, current flows from positive battery at 127, through contact 128 (lifted) of relay V³, to conductor 30, and thence over branch conductor 31 to the code timing relay C', and to negative battery at 32. As to relay V⁴, current flows from positive battery as indicated at 129 over contact 130 (lifted) of relay V⁴ to conductor 30, and branch conductor 31, and thence to the code timing relay C', and to negative battery at 32.

While the simultaneous testing on tracks K³ and K⁴ is conducted, the coded current is divided at the loop transformer F, part of such current flowing from the secondary winding of the loop transformer F through conductor 51, contacts 131 and 132 of relay V³, to conductor 133, and resistor S³ to the track circuit L³. Another part of the coded current is carried from conductor 51, through contacts 135 and 136 of relay V⁴, and thence over conductor 137 and resistor S⁴ to the track circuit L⁴.

Moreover, the pilot lights associated with push buttons A², A³ and A⁴, are operated in the manner hereinbefore described. As to pilot lights P² and Q², current is supplied over contact 65 or over conductor 115 depending upon the conditions, to negative battery at 116. As to pilot lights P³ and Q³, current is supplied over contact 96 or over conductor 117 to negative battery at 118. As to pilot lights P⁴ and Q⁴, current is supplied over contact 100 or over conductor 119 to negative battery at 124.

It will be observed that tracks K², K³ and K⁴, are provided in the same manner as track K¹ with means for removing the regular track signal current while a test is in progress. Thus as to track K², when the relay V² is energized, its contact 77 breaks a circuit over conductor 138, through the track transformer R², to the negative side of the line as indicated at r²; as to track K³ the contact 123 of relay V³ breaks a circuit over conductor 139 through the track transformer R³, to the negative side of the line as indicated at r³; and as to track K⁴ the contact 126 of relay V⁴ breaks a circuit over conductor 140 through track transformer R⁴ to the negative side of the line as indicated at r⁴.

The apparatus shown in Figs. I and I—A is particularly suitable for use at terminals where locomotives or cars may be tested preparatory to departure. Where testing equipment is provided at a wayside station, as for example at the entrance to cab signal territory, and particularly where a large volume of traffic is encountered, it may be desirable to eliminate the manually operated push buttons and to substitute automatic initiation of the test. The example of my invention shown in Fig. II provides for the automatic initiation of a test immediately upon the entrance of a vehicle into the test territory.

In Fig. II three tracks are shown designated at $K^5$, $K^6$, and $K^7$. The track circuits are similar to those previously described and are designated $L^5$, $L^6$, $L^7$. Similar letter designations are likewise given to all of the instrumentalities like those used with the circuits previously described, in each case the exponent corresponding to the number of the track in which the instrumentality is associated. The testing circuit including the code transmitter M, the code timing relays $C'$, $C''$, $C'''$, and the coding units $N'$, $N''$, and $N'''$, is identical to the testing circuit previously described, save for the connections over which electrical current is supplied. The operation of the apparatus shown in Fig. II is as follows:

Let it be assumed that the tracks $K^5$, $K^6$, and $K^7$, are unoccupied in the test territory, and that the train enters the test territory on track $K^5$. Before the train reaches the track circuit $L^5$, the car axles of the leading vehicle will shunt the track relay $Y^5$, causing its normally lifted contact 145 to drop. Current will then flow from positive battery 146, through contact 145 (dropped) of relay $Y^5$, conductor 147, to a point in the vicinity of the relay $T^5$, thence to conductor 148, conductor 149, to contact 150 (dropped) of relay $V^6$, thence to conductor 151, to contact 152 (dropped) of relay $V^7$, conductor 153, the resistance $I^5$, to the armature of the relay $T^5$, to negative battery at 154. The relay $T^5$ will then become energized and its contacts 155 and 156 will lift. As soon as contact 155 lifts, a stick circuit is established for the relay $T^5$, current flowing from conductor 147, through contact 155 (lifted), and thence through the relay $T^5$, to negative battery at 154. The presence of the resistor $I^5$ retards the pick up of the relay $T^5$ and permits the relay $V^5$ to complete its stroke before its pick up circuit is broken over contact 156. The relay $V^5$ is energized with current flowing from conductor 153, through contact 156 (dropped) of relay $T^5$, and thence through conductor 157, the armature of relay $V^5$, conductor 158, branch conductor 159, contact 20 (dropped) of code timing relay $C'''$ to negative battery at 21. As soon as the relay $V^5$ picks up, a stick circuit is established, current flowing from conductor 148, to conductor 149, and thence through contact 162 (lifted) of relay $V^5$, conductor 163, conductor 157, the armature of relay $V^5$, conductors 158 and 159 to negative battery at 21. With the relay $V^5$ energized, alternating current at, say, 100 cycle frequency is supplied from one side of the line as indicated at 164, over contact 165 (lifted) of relay $V^5$, and conductor 166, through the code transmitter M to the other side of the line as represented at 167. At the same time the normal track current supplied over conductor 168 and through the track transformer $R^5$ to the negative side of the line at $r^5$ is broken by the lifting of contact 165 of relay $V^5$. Battery energy is supplied to the code timing relays $C'$, $C''$, $C'''$, with current flowing from conductor 148, to contact 169 (lifted) of relay $V^5$, conductor 170, branch conductor 171, to code timing relay $C'$, and thence to negative battery at 32.

The operation of the code transmitter M, the code timing relays $C'$, $C''$, $C'''$, and the coding units $N'$, $N''$, $N'''$, is precisely the same as that described in the operation of the testing circuit of the apparatus of Figs. I and I—A, and induces into the loop transformer F the series of coded signals in the manner explained. Current induced in the secondary winding of the loop transformer F flows through conductor 172, to conductor 173, and thence through contacts 174 and 175 of relay $V^5$, and thence through conductor 176 and the adjustable resistor $S^5$ to the test track circuit $L^5$, and thence through conductor 177 back to the secondary winding of loop transformer F.

At the termination of the test, when the code timing relay $C'''$ has picked up its contact 20, the circuit over which the relay $V^5$ is energized is broken and the contacts of this relay are restored to their normal position. However, the relay $T^5$ remains energized until the vehicle has passed beyond the track circuit $L^5$, and its contacts are then restored to their normal position. Accordingly, there is no danger of the test repeating on track $K^5$, but the code timing portion of the circuit is nevertheless rendered available for a test on other tracks even while a train remains over the test track circuit $L^5$.

A push button $A^5$ is provided to permit the test to be repeated, if desired, by manual initiation. Provided that tests are not in progress on tracks $K^6$ and $K^7$, the attendant may repeat the test by closing the push button $A^5$. Current will then flow through conductors 148 and 149, contact 150 (dropped) of relay $V^6$, conductor 151, contact 152 (dropped) of relay $V^7$, conductor 153, resistor $I^5$, to conductor 134, and thence through the push button $A^5$, with a portion passing through the pilot light $P^5$ to negative battery at 179, and another portion passing over conductors 178 and 157 to the relay $V^5$ and over conductors 158 and 157 to negative battery at 21. When the stick circuit for the relay $V^5$ is established, the pilot light $P^5$ will be illuminated to indicate to the attendant that the test is in operation.

To give another example of the operation of the apparatus shown in Fig. II, let it be assumed that the track $K^5$ is occupied in the test territory, and that a train enters the test territory on track $K^6$. Before the leading vehicle of the latter train reaches the test circuit $L^6$, the track relay $Y^6$ will be de-energized and its contact 180 dropped. The relay $T^6$ and $V^6$ will not operate, however, for their operating circuits are broken at contact 181 of the relay $V^5$. As soon, however, as the test has been completed on track $K^5$ and the relay $V^5$ has been restored to its normal condition, a circuit will be automatically completed with current flowing from positive battery at 182, through contact 180 (dropped) of track relay $Y^6$, conductor 183, conductor 184, conductor 185, contact 186 (dropped) of relay $V^7$, conductor 187, contact 181 (dropped) of relay $V^5$, conductor 188, contact 189 (dropped) of relay $T^6$, conductor 190, relay $V^6$, conductor 158, conductor 159, contact 20 (dropped) of code timing relay $C'''$ to negative battery at 21. Shortly thereafter the relay $T^6$ picks up, with current flowing through the resistor $I^6$ of the relay $T^6$ to negative battery at 191. The resistor $I^6$ retards the pick up of the relay $T^6$ so as to permit the relay $V^6$ to complete its stroke before its pick up circuit is broken over the contact 189 of relay $T^6$. A stick circuit is established for the relay $T^6$ over the contact 141.

As soon as the relay $V^6$ picks up, a stick circuit is established from conductor 184, conductor 185, to contact 193 (lifted) of relay $V^6$, and thence through conductor 194 to the armature of the relay $V^6$. When the relay $V^6$ has thus been energized and the stick circuit established, alternating current at, say, 100 cycle frequency is supplied from one side of the line as indicated at 75

195, over contact 196 (lifted) of relay V⁶, and conductors 197 and 166, through the code transmitter M at the other side of the line as represented at 167. At the same time the normal track current supplied over conductor 198 and through tracks transformer R⁶ to the negative side of the line at r⁶ is broken by the lifting of contact 196 of relay V⁶. The battery energy is supplied to the code timing relays C', C'', C''', with current flowing from conductor 184, through contact 200 (lifted) of relay V⁶, conductor 201, branch conductor 171, to code timing relay C', and thence to negative battery at 32. The operation of the code testing device will then proceed as previously described. Current induced in the secondary winding of the loop transformer F flows through conductor 172, to conductor 173, and thence through contacts 202 and 203 (lifted) of relay V⁶ to conductor 204, and the adjustable resistor S⁶ to the test track circuit L⁶, and thence through conductor 177 back to the secondary winding of the loop transformer F.

At the termination of the test the contacts of the relay V⁶ will be restored automatically to normal condition by the breaking of the energizing circuit at contact 20 of code timing relay C'''. The test can then only be repeated by manual operation of push button A⁶. Provided that tests are not in progress on tracks K⁵ and K⁷, the attendant may repeat the test by closing the push button A⁶. Current will then flow through conductors 184 and 185, contact 186 (dropped) of relay V⁷, conductor 187, contact 181 (dropped) of relay V⁵, conductor 188, resistor I⁶, conductor 205, thence through the push button A⁶, with the current dividing, part passing through the pilot light P⁶ to the negative battery at 206 and part passing over conductors 142 and 190 to the relay V⁶, and thence over conductors 158 and 159 to negative battery at 21. The pilot light P⁶ will be illuminated to indicate to the attendant that the test is in operation.

To illustrate finally the third example of the operation of the apparatus shown in Fig. II, let it be assumed that tracks K⁵ and K⁶ are both occupied when a train enters the territory on track K⁷. Before the train reaches the track circuit L⁷, the car axles of the leading vehicle will shunt the track relay Y⁷, causing its normally lifted contact 207 to drop. Nothing can happen until the tests on tracks K⁵ and K⁶ have been completed.

At the completion of these tests, current will then flow from positive battery at 208, through contact 207 (dropped) of relay Y⁶, conductor 209, to a point in the vicinity of the relay T⁷, thence to conductor 210, conductor 211, to contact 212 (dropped) of relay V⁶, thence to conductor 213, to contact 214 (dropped) of relay V⁵, thence to conductor 215, through contact 216 (dropped) of relay T⁷, to conductor 217, and thence through the armature of the relay V⁷, to conductor 158, branch conductor 159 to negative battery at 21. Thus the relay V⁷ will become energized, and immediately following the relay T⁷ will become energized with current flowing from conductor 215 through the resistor I⁷, to the armature of the relay T⁷, to negative battery at 218. As soon as contact 219 lifts, a stick circuit is established for the relay T⁷, current flowing from the conductor 209, through contact 219 (lifted) and thence through the relay T⁷ to negative battery at 218. A stick circuit is formed for the relay V⁷, with current flowing from conductor 210, to conductor 211, and through contact 199 (lifted) of relay V⁷, conductor 228, to the armature of relay V⁷ and over conductors 158 and 159 to negative battery at 21.

With the relay V⁷ energized, alternating current at, say, 100 cycle frequency is supplied from one side of the line as indicated at 220, over contact 221 (lifted) of relay V⁷, and conductor 192, through the code transmitter M to the other side of the line as represented at 167. At the same time the normal track current supplied over conductor 222 and through the track transformer R⁷, to the negative side of the line at r⁷, is broken by the lifting of contact 221 of relay V⁷. Battery energy is supplied to the code timing relay C', with current flowing from conductor 210, to contact 223 (lifted) of relay V⁷, conductors 224 and 171 to code timing relay C', and thence to negative battery at 32. The operation of the testing circuit then follows in the manner previously described. Current induced in the secondary winding of the loop transformer F flows through conductor 172 to contacts 225 and 226 (lifted) of relay V⁷, and thence through conductor 227 and the adjustable resistor S⁷ to the test track circuit L⁷, and thence through conductor 177 back to the secondary winding of loop transformer F.

At the termination of the test, when the code timing relay C''' has picked up its contact 20, the circuit over which the relay V⁷ is energized is broken and the contacts of this relay are restored to their normal position.

To repeat a test on track K⁷, assuming that tests are not in progress on tracks K⁵ and K⁶, and that the train is still over the test circuit L⁷, the operator may press the push button A⁷. In this event current will flow from conductor 210, through conductor 211, contact 212 (dropped) of relay V⁶, conductor 213, contact 214 (dropped) of relay V⁵, conductor 215, resistor I⁷, to conductor 229, thence through push button A⁷ dividing, with a portion passing through pilot light P⁷ to negative battery at 230, and another portion passing through conductors 231 and 217 to the relay V⁷, and thence through conductors 158 and 159 to negative battery at 21.

In Fig. III there is shown an example of apparatus of my invention illustrating two or more tracks controlled by a single testing circuit, in which one track has its test initiated automatically and the other track has its test initiated manually. In Fig. III the two tracks are designated at K⁸ and K⁹. The track circuits are similar to those previously described and are designated at L⁸ and L⁹. Similar letter designations are likewise given to all of the instrumentalities like those used with the previously described circuits, in each case the exponent corresponding to the number of the track in which the instrumentality is associated. The testing circuit including the code transmitter M, the code timing relays C', C'', C''', and the coding units N', N'', N''', is similar to the testing circuit hereinbefore described save for the connections over which electrical current is supplied, and the provision of an extra contact associated with the code timing relay C'''.

The operation of the apparatus shown in Fig. III is as follows. Let it be assumed that the tracks are unoccupied and that a train enters the test territory on track K⁸. Before the train reaches the track circuit L⁸, the car axles of the leading vehicle will shunt the track relay Y⁸ causing its normally lifted contact 235 to drop. Current will then flow from positive battery at 236, through contact 235 (dropped) of relay Y⁸ to conductor 237, and thence through contact 238 of relay V⁹ to conductor 239, resistor I⁸, through the armature of the relay T⁸, to negative battery at 240. Inasmuch as the resistor I⁸ retards the pick up of relay T⁸, current in the meanwhile flows from conductor 239 to contact 241 (dropped) and thence to conductor 242, and the armature of relay V⁸, and conductor 243, to negative battery at 240. A stick circuit is established for relay V⁸, over conductor 237, conductor 244, contact 245 (dropped) of relay C''', conductor 246, contact 247 (lifted) of relay V⁸, conductor 248, conductor 242, the armature of relay V⁸, conductor 243 to negative battery at 240. A stick circuit is also established for the relay T⁸, current flowing from conductor 237, contact 249 (lifted) of relay T⁸, the armature of relay T⁸, to negative battery at 240.

Coded current is applied to the track circuit L⁸ as follows. Alternating current flows from the positive side of the line as indicated at 250, through contact 251 (lifted) of relay V⁸, and conductor 252 to the code transmitter M, and thence to the negative side of the line as indicated at 253. At the same time direct current flows from positive battery at 254, through contact 255 (lifted) of relay V⁸, conductor 256, to the code timing relay C', and thence to negative battery at 32.

With the code transmitter M in operation, alternating current flows through the conductor 257 to the coding units N', N'', N'''. The operation of the coding units N', N'', N''', in conjunction with the code timing relays C', C'', C''', is the same as previously described and serves to generate the code signals in the proper order and over the proper interval of time in the circuit which leads through the primary winding of the loop transformer F to the negative side of the line as indicated at 40.

The current induced in the secondary winding of the loop transformer F passes through conductor 258 to contacts 259 and 260 of relay V⁸, and thence through conductor 261 and the adjustable resistor S⁸ to the track circuit L⁸, and finally through conductor 262 back to the secondary winding of the loop transformer F. While the test is in progress, the pilot light P⁸ is illuminated with current flowing through a branch of the stick circuit of the relay V⁸ consisting of conductor 263, the pilot light P⁸ and negative battery 264. Moreover, while the test is in progress, the raising of contact 251 of relay V⁸ breaks the circuit over conductor 295 and through the track transformer R⁸ to the negative side of the line r⁸.

When the test has been completed on track K⁸ and the code timing relay C''' has finally picked up its contacts, the stick circuit to the relay V⁸ is broken by the opening of contact 245 of the code timing relay C'''. This restores the contacts of the relay V⁸ to their normal posiiton. The relay T⁸, however, is not effected by the termination of the test, and remains energized so long as a train is on the test track circuit L⁸, preventing any repetition of the test. If it is desired for some reason to repeat the test by a manual operation, this can be performed by pressing the push button A⁸ while the train is over the track circuit L⁸. The test can only be repeated if the other track K⁹ is unoccupied, and when performed current flows from conductor 239 to the push button A⁸, dividing with a portion passing over conductor 242, to the armature of relay V⁸, and conductor 243, to negative battery at 240 and a portion passing through pilot light P⁸ to negative battery at 264.

For the purpose of performing tests on track K⁹, a push button A⁹ is provided. When a train has passed onto the track circuit L⁹ de-energizing the track relay Y⁹, the test is initiated by the manual operation of pressing the push button A⁹. Current then flows from positive battery at 270, through contact 271 of track relay Y⁹, conductor 272, the push button A⁹, conductor 273, contact 274 (dropped) of relay V⁸, conductor 275, through the armature of relay V⁹, to negative battery at 276. A stick circuit is established, upon release of the push button A⁹, for the relay V⁹, with current flowing from conductor 272, through conductor 232, conductor 283 (lifted) of relay V⁹, conductor 233, contact 234 (dropped) of code timing relay C''', thence over conductor 292, conductor 275, through the armature of relay V⁹ to negative battery at 276. A branch of this circuit is also established through conductor 284 and the pilot light P⁹ to negative battery at 285.

When the relay V⁹ is thus energized, alternating current flows from the positive side of the line as indicated at 277, through contact 278 (lifted) of relay V⁹, and conductor 279, to conductor 257, and thence through the code transmitter M to the negative side of the line as indicated at 253. The code timing relays are energized with current flowing from positive battery at 280, through contact 281 (lifted) of relay V⁹, and conductor 282, to conductor 256, and thence through code timing relay C' to negative battery at 32.

In the event that a test is in progress on track K⁸, the test cannot be initiated manually on track K⁹ until the test on track K⁸ is completed. The operator will know whether he is initiating a test on track K⁹ by watching the pilot light P⁹, which will not be illuminated unless the relay V⁹ has picked up. When the relay V⁹ has picked up, the pilot light P⁹ will be illuminated by current flowing from conductor 272, conductor 232, through contact 283 (lifted) of relay V⁹, to conductor 284, and through the pilot light P⁹ to negative battery at 285.

In performing the test on track K⁹, the coding units N', N'', N''', together with the code timing relays C', C'', C''', furnish coded current to the loop transformer F in the manner previously described. This induces in the secondary winding of the loop transformer a current which flows through conductor 293 to contacts 286 and 287 (lifted) of relay V⁹, and thence through the adjustable resistor S⁹ to conductor 288, and thence through the track circuit L⁹ and conductor 289, to the other side of the secondary winding of the loop transformer F. While the test is in progress, the raising of contact 278 of relay V⁹ breaks the circuit over conductor 290 and through the track transformer R⁹ to the negative side of the line at r⁹.

In the above circuit, as well as in the other circuits described, tests cannot be initiated by the push button unless vehicles are on the test sections. Thus buttons depressed by unauthorized meddlers will not operate any equipment, except in the regular manner. This precaution is necessary to prevent the possibility of a stop signal being displayed to an approaching train. If an unauthorized person were to press the operating push button and to operate the equipment while a train was on the test section, but before it had reached a test track circuit, the regular train signal current would be removed from the track, and signals would be displayed which might necessitate a rough stop of the approaching train. In all of the above circuits means have been provided for removing the regular track current from the test track section while a test is in progress. It will be appreciated, however, that the use of means for thus removing the regular track current is dependent upon conditions, and that where a track transformer is located at the entrance end of the test section, it is not necessary to interrupt the track circuit current, for the axles of the approaching train shunt this current, and it does not pass under the track receiver on the leading vehicle which is ahead of the leading pair of wheels.

It will also be apparent that the determination of the particular type of test circuit to be employed depends upon the conditions which prevail at the location. In some locations it is desirable to employ apparatus which is fully automatic and of the type shown in Fig. II. In other locations it is desirable to employ apparatus in which the selective initiation of the tests is performed by a manual operation. In still other locations it has been found desirable to limit the number of tracks automatically controlled and to provide certain tracks which are manually controlled, as illustrated in Fig. III.

While I have described several examples of the practice of my invention and have referred in detail to the particular instrumentalities and circuits that are desirably employed, it will be apparent that numerous changes are contemplated in the form of apparatus to be used, all without departing from the spirit of my invention as defined in the annexed claims.

Having thus described my invention, I claim:

1. Apparatus for testing a railroad signal system comprising a plurality of separate track circuits, a test circuit adapted for connection with any one of said track circuits, said test circuit including a code transmitting device for inducing code signals in a prescribed succession in the track circuits, means for selectively initiating a test on any one of said track circuits, and circuit controlling means for governing the operation of said code transmitting device, said circuit controlling means serving to postpone a test so initiated on one of said track circuits while a similar test is being performed on another of said track circuits, and automatically to set the initiated test in operation at the completion of the test in progress.

2. Apparatus for testing a railroad signal system, comprising a plurality of separate track circuits, a test circuit adapted for connection with any one of said track circuits, said test circuit including a code transmitting device for inducing code signals in a prescribed succession in the track circuits, and circuit controlling means for governing the operation of said code transmitting device including a group of relays selectively connecting the test circuit with any one of the track circuits, each of said relays being energized over contacts of the other relays, said circuit controlling means serving to postpone a test so initiated on one of said track circuits while a similar test is being performed on another of said track circuits, and automatically to set the initiated test in operation at the completion of the test in progress.

3. Apparatus for testing a railroad signal system comprising a test track circuit separate from the track circuit of the regular signal system, a code transmitting device for inducing code signals in a prescribed succession in the test track circuit, and circuit controlling means governing the operation of said code transmitting device including means whereby signal current is automatically removed from the regular track circuit when the code transmitting device is set in operation to initiate a test in the test track circuit, and such current is automatically restored to the regular track circuit upon the completion of the test.

4. Apparatus for testing a railroad signal system comprising a plurality of test track circuits separate from the track circuits of the regular signal system, a code transmitting device for inducing code signals in a prescribed succession in the test track circuits, and circuit controlling means governing the operation of said code transmitting device including a group of relays for selectively initiating a test on any one of said test track circuits, said relays operating contacts in the regular signal system whereby signal current is automatically removed from the regular track circuit when the code transmitting device is set in operation to initiate a test in the test track circuit, and such current is automatically restored to the regular track circuit upon the completion of the test.

5. Apparatus for testing a railroad signal system comprising a track circuit, a test circuit including a code transmitting device for inducing a series of code signals in a prescribed succession in the track circuit, means for automatically connecting the test circuit to the track circuit to initiate a test when a vehicle enters the section of track with which the track circuit is associated, and means for disconnecting the test circuit from the track circuit immediately upon the conclusion of the test, said means preventing automatic repetition of the test while the vehicle remains on said section of track.

6. Apparatus for testing a railroad signal system comprising a track circuit, a test circuit including a code transmitting device for inducing a series of code signals in a prescribed succession in the track circuit, means for automatically setting the code transmitting device in operation to initiate a test when a vehicle enters the section of track with which the track circuit is associated, and means for stopping the code transmitting device immediately upon the conclusion of the test, said means preventing automatic repetition of the test while the vehicle remains on said section of track.

7. Apparatus for testing a railroad signal system comprising a plurality of track circuits, a test circuit adapted for connection with any one of said track circuits, said test circuit including a code transmitting device for inducing code signals in a prescribed succession in the track circuits, means for automatically connecting the test circuit to each track circuit upon the entrance of a vehicle into the section of track with which that track circuit is associated thereby to apply the series of code signals to that track circuit, and means for automatically disconnecting the test circuit from that track circuit upon the completion of the test, said means preventing automatic repetition of the test while the vehicle remains on said section of track.

8. Apparatus for testing a railroad signal system comprising a plurality of track circuits, a test circuit adapted for connection with any one of said track circuits, said test circuit including a code transmitting device for inducing code signals in a prescribed succession in the track circuits, means for automatically connecting the test circuit to each track circuit upon the entrance of a vehicle into the section of track with which that track circuit is associated thereby to apply the series of code signals to that track circuit, and means for rendering said test circuit available for connection with one of the other track circuits upon the completion of the test upon said first track circuit, said means being operable though the vehicle which has completed its test remains on the section of track associated with said first track circuit.

9. Apparatus for testing a railroad signal system comprising a track circuit, a test circuit adapted for connection with said track circuit, said test circuit including a code transmitting device for inducing code signals in a prescribed succession in the track circuit, means operable to connect the test circuit with the track circuit and to start the code transmitting device in operation, and a track relay for controlling the operation of the aforesaid means, said relay being disposed immediately in advance of said track circuit, thereby to prevent the performance of a test except when a vehicle has entered the section of track associated with said track circuit.

ARCHIE D. WHAMOND.